W. M. McCLEAREN.
AUTOMOBILE BED.
APPLICATION FILED FEB. 12, 1918.
1,281,037.
Patented Oct. 8, 1918.
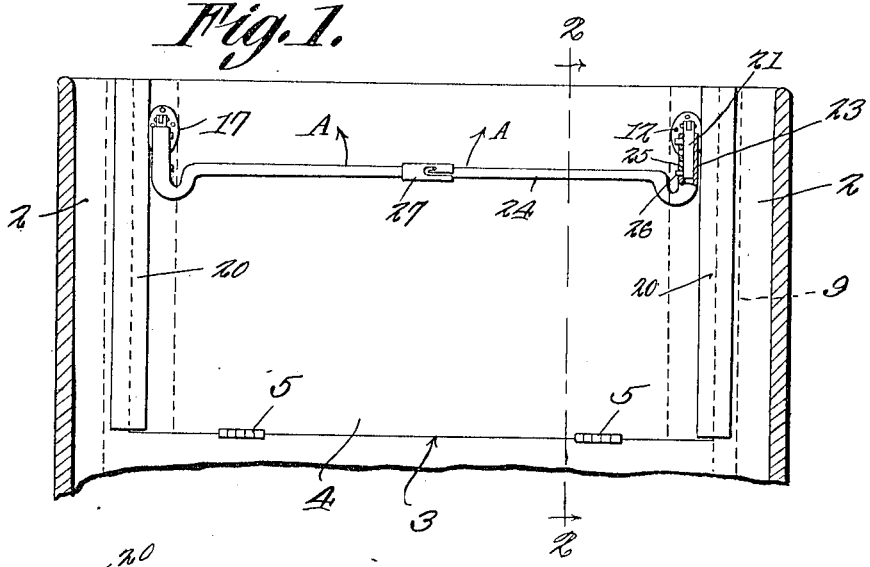

UNITED STATES PATENT OFFICE.

WILLIAM M. McCLEAREN, OF DINUBA, CALIFORNIA, ASSIGNOR OF ONE-FOURTH TO JOE BLAIR, OF DINUBA, CALIFORNIA.

AUTOMOBILE-BED.

1,281,037.     Specification of Letters Patent.     Patented Oct. 8, 1918.

Application filed February 12, 1918. Serial No. 216,840.

*To all whom it may concern:*

Be it known that I, WILLIAM M. Mc-CLEAREN, a citizen of the United States, residing at Dinuba, in the county of Tulare and State of California, have invented a new and useful Automobile-Bed, of which the following is a specification.

It is the object of this invention to provide novel means whereby a portion of the back of a front seat in a vehicle may be turned downwardly to form, with the back seat of the vehicle, a bed in the vehicle.

The invention aims to provide novel means for controlling the latches which hold the bed forming panel closed, and to provide novel means for supporting the panel when the panel is turned downwardly and rearwardly to form a bed.

It is within the province of the disclosure to improve generally and to enhance the utility of devices of that type to which the present invention appertains.

With the above and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings:—

Figure 1 shows in transverse section, a vehicle whereunto the device forming the subject matter of this application has been applied;

Fig. 2 is a section taken on the line 2—2 of Fig. 1;

Fig. 3 is an elevation looking at the inside of the panel and attendant parts;

Fig. 4 is a sectional detail showing the latch mechanism;

Fig. 5 is an elevation showing the separable connections between the inner ends of the robe-rod; and Fig. 6 is a fragmental elevation showing the means whereby the ends of the robe-rod are connected with the shafts which operate the latches;

Fig. 7 is a fragmentary perspective showing a slight modification in the invention.

The numeral 1 denotes a forward seat in a vehicle. The back of the seat is shown at 2. In the seat back 2 an opening 3 is formed.

A panel 4 is fitted in the opening 3. The lower edge of the panel 4 is united with the seat back 2 at the bottom of the opening 3 by means of hinges 5, so that the panel 4 can be swung downwardly and rearwardly. Reinforcing bars 7 are applied to the inner surface of the panel 4 along the vertical edges of the panel. A reinforcing bar 8 extends along the lower edge of the panel 4 on the inside thereof. Reinforcing bars 9 extend vertically along the inner face of the back 2 adjacent the opening 3. A strip 10, preferably made of metal, extends along the inner face of the bar 8, the strip and the bar 8 being held to the panel 4 by means of securing elements. Metal strips 12 extend along the inner faces of the bars 7 on the panel 4, the strips and the bars being held to the panel 4 by means of securing elements 14, the strips 12 being spaced from the bars 7. Metal strips 15 extend longitudinally of the inner faces of the bars 9 on the inner face of the back 2. The strips 15 and the bars 9 are held to the back 2 by means of securing elements 16. T members 22 are secured to the panel 4, one flange of each T member 20 serving as a covering for the edge of the panel 4 and the bar 7, another flange of the T member overlapping the rear face of the back 2 as shown in Figs. 1 and 4.

Face plates 17 are secured to the outer surface of the panel 4 near to the upper edge thereof and near to the sides of the panel. Shafts 18 are journaled in the face plates 17, in the panel 4, in the bars 7 and in the strips 12. Hook shaped latches 30 operate between the strips 12 and the bars 7 and are secured to the shafts 18. The latches 30 are adapted to engage with projections 19 on the strips 15. Rods 21 are hinged as shown at 22 to the rear ends of the shafts 18 for vertical swinging movement. The rods 21 are adjustably received in rectangular sockets 23 formed on the parts 24 of a robe-rod extended transversely of the panel 4 and located to the rear thereof. The sockets 23 are provided with bayonet slots 25 adapted to receive pins 26 on the rods 21. The inner ends of the parts 24 of the robe-rod are connected by a sleeve 27 having a locking slot 28 adapted to receive a pin 29 on one of the parts 24.

When the structure is arranged as shown in Fig. 1, that is, when the panel 4 is closed, the latches 30 engage with the parts 19, and engage behind the strips 15. Consequently, the panel 4 cannot swing downwardly and rearwardly. The shafts 18 cannot rotate and move the latches 30 to unlocked positions, because the rods 21 which are hinged to the shafts are received in the sockets 23 of the parts 24 of the robe rod, and because these parts of the robe rod are united by the sleeve 27.

The sleeve 27 may be moved endwise to disengage the pin 29 from the locking slot 28, thereby separating the inner ends of the parts 24 of the robe-rod. The inner ends of the parts 24 of the robe-rod may be swung upwardly as indicated by the arrows A in Fig. 1. In this way, the shafts 18 will be rotated, and the latches 30 may be disengaged from behind the strips 15. The panel 4 can then be swung rearwardly and downwardly on its hinges 5. When the panel 4 is in a horizontal position, as above described, the panel is adapted to coact with a rear seat (not shown) of the vehicle, to form a bed, and when the panel 4 thus forms a bed, the robe-rod and the rods 21 swing on the hinges 22 until the robe-rod forms a depending leg or support for the free edge of the panel and holds the panel in such a position that it will form a part of a bed, as above described. The effective length of the leg above mentioned may be varied by adjusting pins 26 in the bayonet slots 25 of the sockets 23. When the panel 4 is in the closed position of Fig. 1, the robe-rod 24—24 may be swung toward and away from the panel 4, to receive a robe, in the usual way, the hinges 22 permitting such an operation.

In Fig. 7 of the drawings, parts hereinbefore described have been designated by numerals previously used, with the suffix "a". In this form of the invention, the parts 24ª of the robe-rod or supports are of angular construction and are pivoted directly at 22ª to the shafts 18ª.

Having thus described the invention, what is claimed is:—

1. In a vehicle, a seat back; a panel hinged to the back; shafts journaled in the panel; latches carried by the shafts and coacting with the back to hold the panel closed; and rigid supports hinged to the shafts and constituting legs for the panel when the panel is turned down to form a part of a bed in the vehicle, the supports forming means for rotating the shafts to operate the latches.

2. In a vehicle, a seat back; a panel hinged to the back; shafts journaled in the panel; latches carried by the shafts and coacting with the back to hold the panel closed; a robe-rod extended transversely of the panel; means for hingedly connecting the ends of the robe-rod with the shafts whereby the robe-rod will form a support for the panel when the panel is swung down to constitute a part of a bed in the vehicle, the robe-rod comprising rigid separable parts, and a connection uniting the inner ends of said parts whereby said parts may be disconnected to effect a rotation of the shafts and to operate the latches.

3. In a vehicle, a seat back; a panel hinged to the back; shafts journaled in the panel; latches carried by the shafts and coacting with the back to hold the panel closed; a two-part robe-rod extended transversely of the panel; means for uniting the inner ends of the parts of the robe-rod detachably; and longitudinally extensible connections between the outer ends of the robe-rod and the shafts, said connections being hinged to the shafts.

In testimony that I claim the foregoing as my own, I have hereto affixed my signature in the presence of two witnesses.

WILLIAM M. McCLEAREN.

Witnesses:
 Jos. BLAIR,
 LE ROY G. SMITH.

Copies of this patent may be obtained for five cents each, by addressing the "Commissioner of Patents, Washington, D. C."